United States Patent
Keck et al.

(10) Patent No.: US 7,702,648 B1
(45) Date of Patent: Apr. 20, 2010

(54) LOCALIZATION OF DATA REPRESENTED BY BUSINESS ENTITIES

(75) Inventors: David R. Keck, Findley, OH (US); Terry A. Adams, Findley, OH (US)

(73) Assignee: Microsoft Corporation, Redmond, WA (US)

( * ) Notice: Subject to any disclaimer, the term of this patent is extended or adjusted under 35 U.S.C. 154(b) by 1428 days.

(21) Appl. No.: 10/463,631

(22) Filed: Jun. 17, 2003

(51) Int. Cl.
*G06F 7/00* (2006.01)

(52) U.S. Cl. .................. 707/103 R; 707/E17.032; 705/1; 705/2; 705/4

(58) Field of Classification Search .......... None
See application file for complete search history.

(56) References Cited

U.S. PATENT DOCUMENTS

| | | | | |
|---|---|---|---|---|
| 5,652,884 A | * | 7/1997 | Palevich .................. | 713/1 |
| 6,349,275 B1 | * | 2/2002 | Schumacher et al. ........ | 704/8 |
| RE37,722 E | * | 5/2002 | Burnard et al. ............. | 713/1 |
| 6,623,529 B1 | * | 9/2003 | Lakritz ..................... | 715/536 |
| 7,013,284 B2 | * | 3/2006 | Guyan et al. ............... | 705/9 |
| 7,013,289 B2 | * | 3/2006 | Horn et al. ................. | 705/26 |
| 7,080,089 B2 | * | 7/2006 | Plaisted et al. ............. | 707/101 |
| 2003/0046165 A1 | * | 3/2003 | Topel ........................ | 705/14 |
| 2003/0084401 A1 | * | 5/2003 | Abel et al. ................. | 715/501.1 |
| 2004/0015408 A1 | * | 1/2004 | Rauen et al. ............... | 705/26 |
| 2004/0088155 A1 | * | 5/2004 | Kerr et al. .................. | 704/8 |

* cited by examiner

*Primary Examiner*—Don Wong
*Assistant Examiner*—Shyue Jiunn Hwa
(74) *Attorney, Agent, or Firm*—Christopher J. Volkmann; Westman, Champlin & Kelly, P.A.

(57) ABSTRACT

The present invention provides a localization entity in association with a business entity requested by a requester. During instantiation of the requested business entity, a localization event is triggered which causes a policy handler to implement a localization policy to identify localization values (found in the associated localization entity) for attributes in the business entity. The localization values are received from the localization entity associated with the business entity and are placed in the business entity, as localized values.

14 Claims, 5 Drawing Sheets

LOCALIZATION OF DATA REPRESENTED BY BUSINESS ENTITIES

BACKGROUND OF THE INVENTION

The present invention deals with localization of data in a computing environment. More specifically, the present invention relates to localization of data in business objects (or business entities).

Business entities are objects that are employed in a business computing environment. For example, objects that represent customers (Customer entities), inventory (Inventory entities), and orders (Order entities) can all be business entities. These entities represent data that is related to business applications. The data in a Customer entity, for example, represents a customer such as the customer's name, address, etc. The data in an Inventory entity represents inventory such as part number, description, name, etc., and the data in an Order entity represents a particular order from a customer such as order number, quantity, etc.

Business entities can be used by developers in creating many different types of business applications. Such applications, for example, can track orders and inventory, and implement customer management and customer relations, and many other business related activities.

Localization is a process by which information is adapted to more closely conform to how the data would be expressed in a particular locale, using norms of that particular locale. A very straightforward example of localization is simply language translation. In other words, a particular expression is displayed to the user in the language indigenous to the locale of the user.

In the past, localization has been accomplished through the use of resource files. Specific resource files were retrieved based on the locale of the user, and the information in the retrieved resource file was used. However, this presents a variety of problems. Foremost among those problems is that resource files may typically be unchangeable by a developer. Therefore, while the use of resource files may work for localizing static information, it does not work for localizing dynamic information.

Business applications will typically contain a wide variety of dynamic information that will desirably be localized. For example, inventory entities will contain descriptions for one company, that will be entirely different for another company, simply because the inventory for two different companies will be different. Therefore, the dynamic information used in business applications is not a good candidate for localization through the use of resource files.

SUMMARY OF THE INVENTION

The present invention provides a localization entity in association with a business entity that has been requested by a requester. During instantiation of the requested business entity, a localization event is fired which causes a policy handler to implement a localization policy to identify localization values for attributes in the business entity that are to be localized. The localization values are retrieved from the localization entity associated with the business entity and are placed in the business entity, as the localized values of the attributes in the business entity.

In one embodiment, the policy handler is an object that is configured to look up the localized values by accessing the associated entity which, itself, derives from a Locale entity, and stores the localized values. In another embodiment, the policy handler also includes defaulting logic to obtain default localized values.

The present invention can also be implemented as an object model. In the object model, a business entity has attributes to be localized. A policy handler is invoked based on instantiation of the business entity and is configured to identify localized values for the attributes to be localized. A localization entity is in association with the business entity and is configured to contain the localized values so they can be written into the business entity.

[DK1]

DETAILED DESCRIPTION OF ILLUSTRATIVE EMBODIMENTS

The present invention deals with localization of data. More specifically, the present invention deals with using an associated localization entity to localize data in a business entity in order to implement desired localization policies. However, prior to discussing the present invention in detail, one illustrative embodiment of an environment in which the present invention can be used will be discussed.

Figure 1:
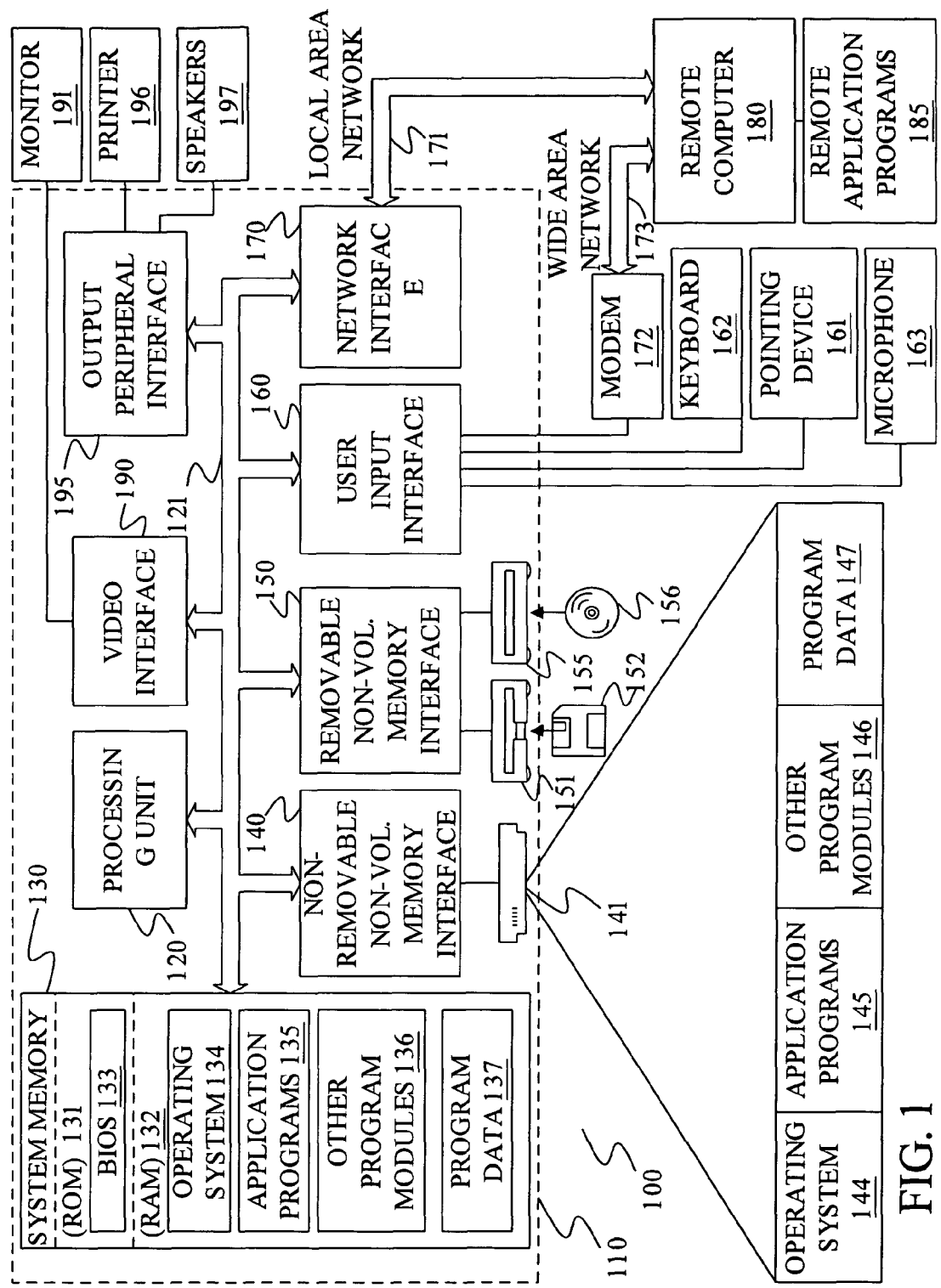
FIG. 1 is one illustrative embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

While the present invention can be used in a wide variety of environments, such as a relational database environment or an object oriented database environment, it is described herein in an object-relational database environment for exemplary purposes. One embodiment of such an object-oriented data accessing system is now discussed for purposes of example only.

Figure 2:
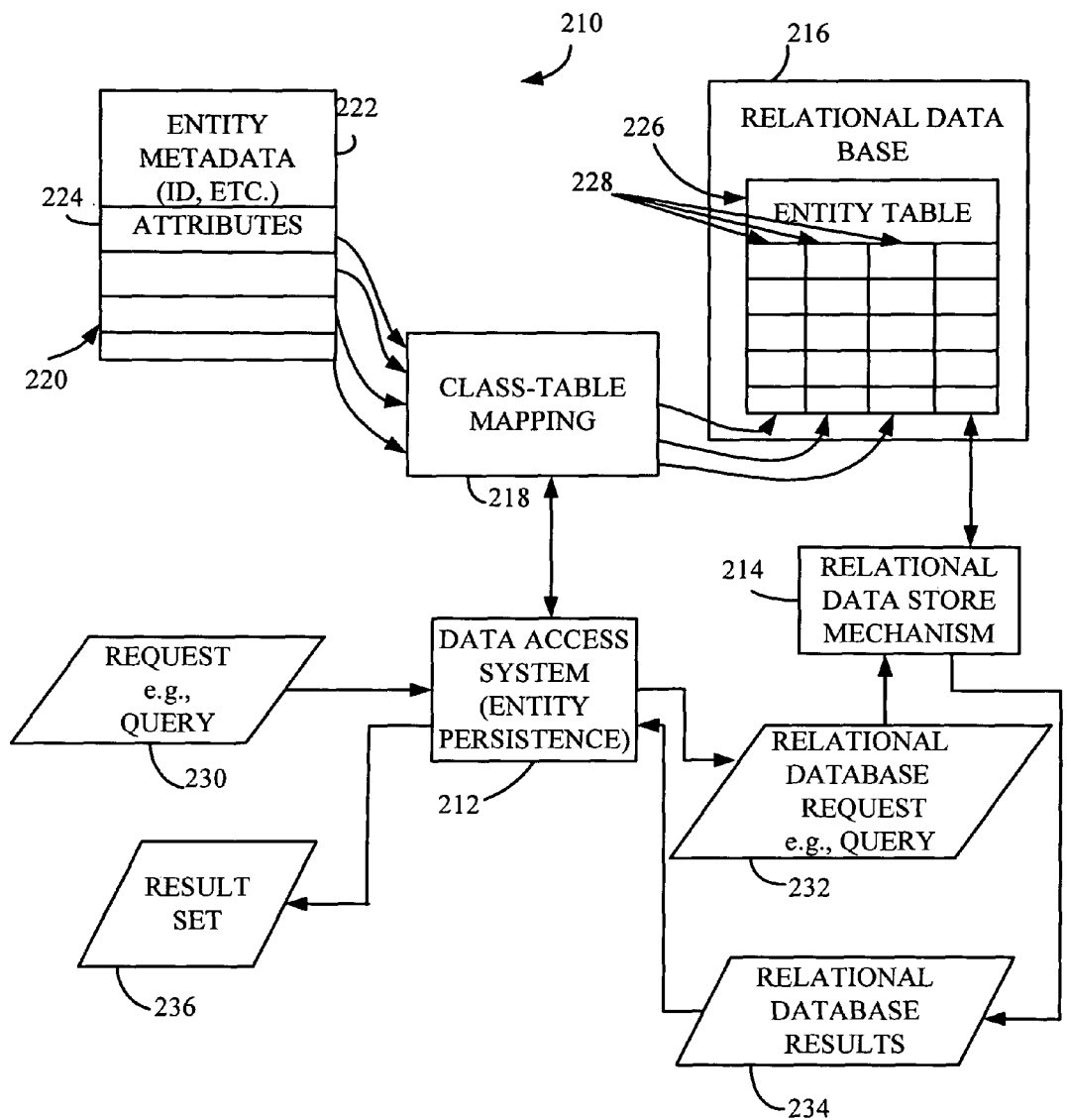
FIG. 2 is a block diagram of a data accessing system in accordance with one embodiment of the present invention.

FIG. 2 is a block diagram illustrating one embodiment of a data storage and accessing system 210 in accordance with the present invention. System 210 includes data access system (or entity persistence system) 212, relational data store mechanism 214, relational database 216, and class-table mapping 218. System 210 is illustratively an object-relational (O-R) data storage system in which stored data can be referred to in terms of entities (or objects) and their properties, rather than elements of the data base schema, such as tables and columns. FIG. 2 illustrates one mechanism for doing this.

As shown in FIG. 2, the data can be organized in terms of entities (or objects) 220. Each entity illustratively includes a metadata portion 222 stored in a metadata store and a remaining attributes portion 224. The metadata portion 222 describes the entity 220, and its associations with other entities, while the remaining attributes 224 define further attributes of entity 220, such as the data stored therein. Each of the attributes in entity 220 is mapped to a corresponding entity table 226 and a specific column 228 in a given entity table 226.

Data access system 212 can receive forms of a request such as a query 230 which specifies an entity, or portions of an entity or group of entities, to be retrieved. Query 230 can illustratively be expressed in terms of objects ("entities") and properties rather than in terms of tables and columns. The particular manner in which queries are expressed does not form part of the present invention.

Data access system 212 receives the query 230 and accesses class-table mapping 218 and metadata 222 in a metadata store. In this way, data access system 212 can identify entities associated with the requested entity and determine the location of the data for the entities identified by query 230 and its associated entities. Data access system 212 includes a translator 213 that translates query 230 into a relational database query 232 which is suitable for input to relational data store mechanism 214. In one illustrative embodiment, relational data store mechanism 214 is a server that operates according to the structured query language (SQL) programming language in accessing relational database 216. Therefore, data access system 212 receives queries 230 in terms of objects and translates those queries into an appropriate relational database query 232 that is then provided to the data-store mechanism (or server) 214 which actually accesses the data in relational database 216.

Relational data store mechanism 214 retrieves the requested data and returns it in the form of relational database results 234. The results are returned to data access system 212 which then formulates the relational database results 234 into a requested result set 236. In one illustrative embodiment, result set 236 is requested in query 230. Query 230 may request that the results be output in the form of one or more objects or simply as a data set. In any case, data access system 212 arranges the relational database results 234 into the proper format and outputs them as result set 236.

Figure 3:
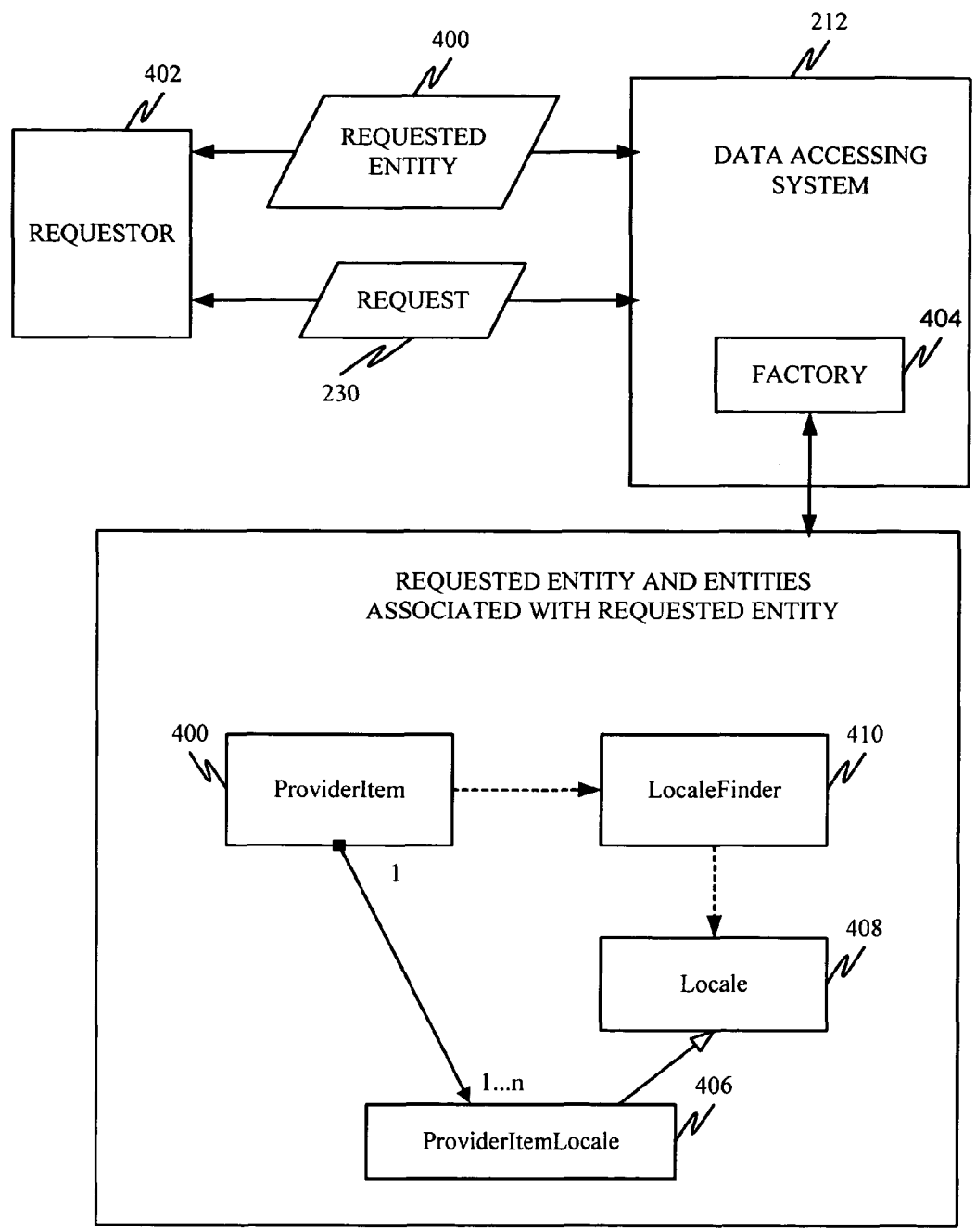
FIG. 3 is a block diagram illustrating localization of a business entity in accordance with one embodiment of the present invention.
Figure 4:
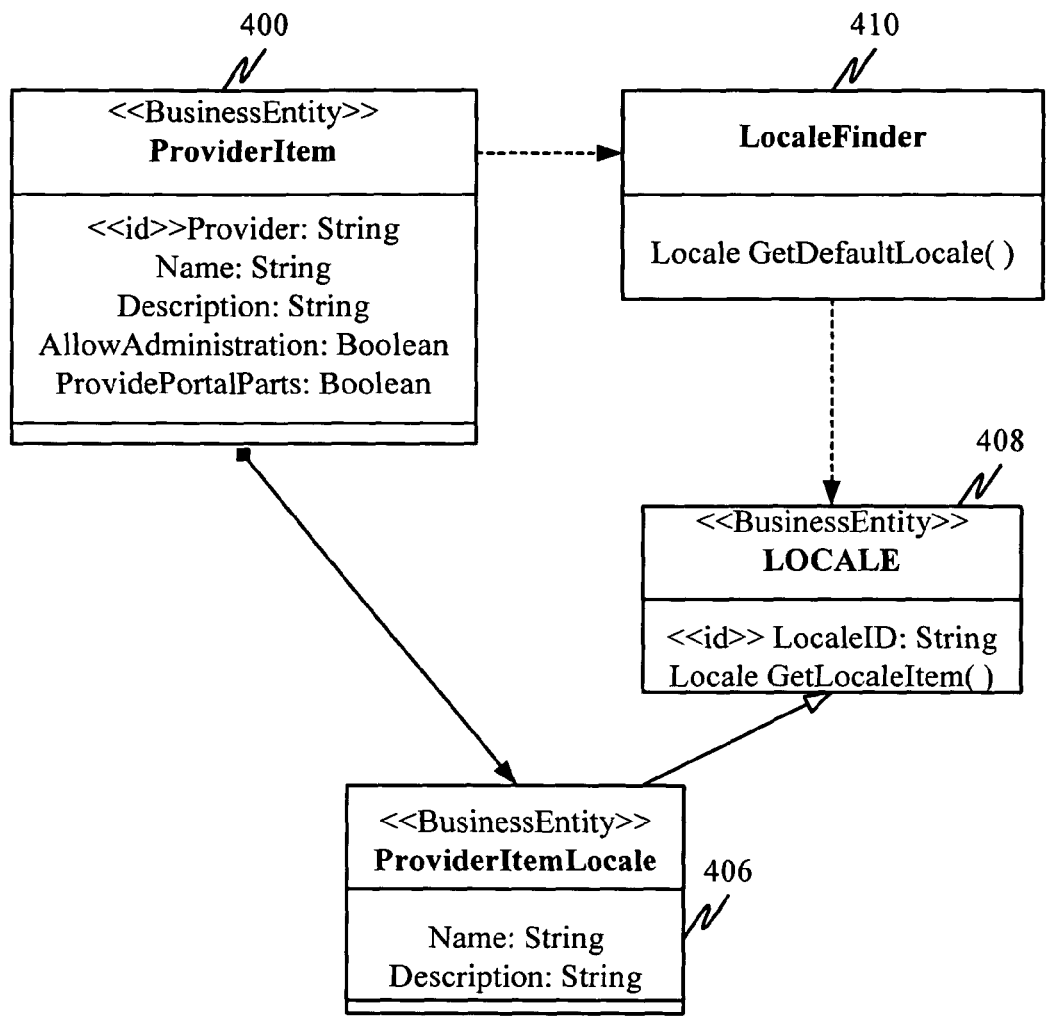
FIG. 4 is a more detailed unified modeling language (UML) diagram of a portion of an object model in accordance with the present invention.
Figure 5:
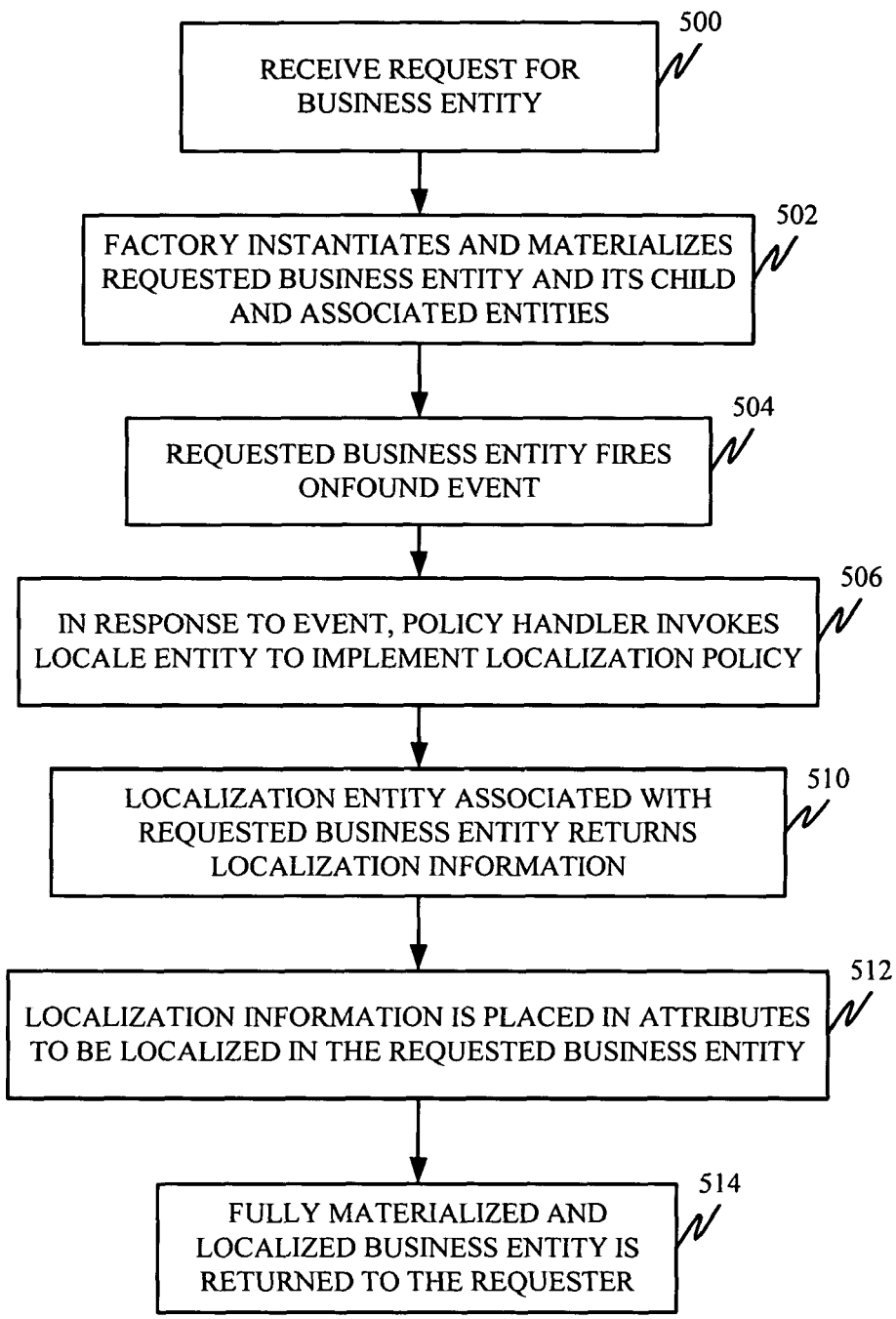
FIG. 5 is a flow diagram illustrating the operation of the system shown in FIG. 3 and the object model shown in FIG. 4 to implement localization in accordance with one embodiment of the present invention.

FIG. 3 is a block diagram better illustrating how data in a requested business entity 400 (referred to herein as the ProviderItem entity) can be localized. FIG. 4 is a more detailed UML diagram of an object model for ProviderItem 400 and related entities, and FIG. 5 is a flow diagram illustrating how data in the ProviderItem entity 400 is localized. FIGS. 3, 4 and 5 will be discussed in conjunction with one another.

A requester 402, which may be an application, an entity, or another requester, first provides a request 230 to data accessing system 212 requesting it to instantiate the ProviderItem entity 400. Data accessing system 212 invokes factory 404 which is configured to access the data store and instantiate ProviderItem entity 400. In doing so, factory 404 examines metadata$_{[DK2]}$ associated with ProviderItem 400 to determine which other entities it is associated with. For instance, Factory 404 will determine that ProviderItem 400 is associated with ProviderItemLocale entity 406. ProviderItemLocale entity 406 derives from a base class Locale entity 408. Factory 404 also determines that ProviderItem entity 400 will invoke LocaleFinder entity 410. Thus, ProviderItemLocale and LocaleFinder 410 are instantiated as well.

Receiving the request from requestor 402 for ProviderItem entity 400 is illustrated by block 500 in FIG. 5, and instantiating and materializing ProviderItem entity 400 and its child and associated entities 406, 408 and 410 is indicated by block 502 in FIG. 5.

FIG. 4 more specifically illustrates the object model corresponding to the entities set out in FIG. 3. Specifically, FIG. 4 is a unified modeling language (UML) diagram of the object model showing ProviderItem 400, ProviderItemLocale 406, Locale 408 and LocaleFinder 410. ProviderItem entity 400 is the entity which has been requested by requester 402 and is therefore the entity which must be localized to conform to the expressive customs indigenous to requestor 402. ProviderItem entity 400 has an association with ProviderItemLocale entity 406. It should be noted that there could be a collection of ProviderItemLocale entities 406, and only one is shown for exemplary purposes.$_{[DK3]}$ However, the "1 . . . n" indicator on the relationship line shows that there can be one or more ProviderItemLocale entities associated with an instance of ProviderItem.

The ProviderItemLocale entity 406 indicates that there are two attributes of ProviderItem entity 400 that must be localized. Those attributes are the "Name" and "Description" attributes, and they have values which are strings. It should be noted that the attributes can have any desired values, and they are shown with strings for exemplary purposes.

LocaleFinder entity 410 implements the localization policy desired by the developer of the system. For example, in one embodiment, LocaleFinder entity 410 performs look ups, in an attempt to implement localization policies, and then results to defaulting logic if no localization can be found. Lookup and defaulting$_{[DK4]}$, in one embodiment is implemented through the GetDefaultLocale( ) method, as described below.

ProviderItemLocale 406 derives from the Locale entity 408. Locale entity 408 is thus the base class for ProviderItemLocale entity 406 and includes a method Locale GetLocaleItem( ). When that method on Locale entity 408 is invoked, it is passed a LocaleID. The method then looks for a localization value with that ID. If it exists, that value is returned. If it does not exist, a null value is returned which indicates that the requested localization value does not exist.

One embodiment of localization is now described in greater detail. Each time ProviderItem entity 400 is instantiated, and before it is returned to reqeuster 402, it fires an event which invokes a response from LocaleFinder 410. For purposes of the present discussion, the event will be referred to as the "OnFound" event, although the particular name of the event is not critical. Firing the OnFound event is illustrated by block 504 in FIG. 5.

In response to the OnFound event, LocaleFinder 410 implements the localization policy by making calls to the GetLocaleItem method on Locale entity 408 and ProviderItemLocale entity 406 (or the collection of ProviderItemLocale entities 406). This is indicated by block 506 in FIG. 5. For example, in one illustrative embodiment, LocaleFinder 410 implements a localization policy that is determined by the location indicated by the thread on which requestor 402 makes its request for ProviderItem entity 400. For instances, if requester 402 calls in on a thread indicating that it is located in France, then LocaleFinder 410 implements a corresponding localization policy.

One[DK5] exemplary policy may be, for instance, calling into Locale entity 408 to see whether the attributes "Name" and "Description" have corresponding values which are in the French language. In order to do this, LocaleFinder 410 invokes the GetLocaleItem( ) method on ProviderItemLocale 406 (which is available through base class Locale entity 408) and passes in an ID corresponding to a French version of the "Name" and a French version of the "Description" attributes. If those localization values exist, they are passed back to LocaleFinder 410 which places them in the "Name" and "Description" string fields in ProviderItem entity 400. If those localization values do not exist, then LocaleFinder 410 proceeds to the next step in the localization policy and requests the next desired localization values from Locale entity 408. For instance, if the French values do not exist, then LocaleFinder 410 may result to its defaulting logic which, in one illustrative embodiment, simply looks for an English version of the attribute values. In order to implement that step, LocaleFinder 410 includes the GetDefaultLocale( ) method which returns an English language version of the attribute values. Those attribute values are then placed in the "Name" and "Description" strings in ProviderItem entity 400. Returning the localization values is illustrated by block 510 in FIG. 5. Placing those attribute values in the corresponding attribute locations in ProviderItem 410 is indicated by block 512 in FIG. 5.

Of course, the defaulting logic can be as complex as desired. For instance, in another example, different locales can have sublanguages that are very similar to a common base language. The defaulting logic can look for other language alternatives that make sense, prior to defaulting to an ultimate default language. In one such embodiment, assume the "Name" and "description" attributes are in the Mexican Spanish language. The defaulting logic may first look for a Spanish language version of those attributes before defaulting to an ultimate default language, such as English. Thus, the defaulting can be done by executing more intelligent logic than a simple lookup operation.

At this point, ProviderItem entity 400 is fully materialized and localized and is ready to be returned. Therefore, ProviderItem entity 400 is returned to requester 402. This is indicated by block 514 in FIG. 5.

The following is exemplary Pseudocode which illustrates how the LocaleFinder entity class is used to look up the localizations for a business entity using the OnFound service method, and how the attribute values are populated using the localization information.

```
protected override void OnFound (EntityEventArgs
args) {
    base.OnFound (args);
    //Lookup the locale instance that contains
the[DK6] localized data
    UIItemDescriptorLocale theLocale =
(UIItemDescriptorLocale) LocaleFinder.GetDefaultLocale
(this.UIItemDescriptorLocales);
    //Connect the returned data to this entity
    if (theLocale != null) {
        this.Name = theLocale.Name;
        this.ShortDescription =
theLocale.ShortDescription;
        this.ongDescription =
theLocale.LongDescription;
        this.ImageURL = theLocale.ImageURL;
    }
}
```

It can thus be seen that LocaleFinder 410 contains the logic for defaulting and implementing the localization policy. The LocaleFinder 410 implements this policy for any entity that derives from the Locale entity 408. ProviderItemLocale entity 406 derives from Locale entity 408 and thus LocaleFinder 410 implements the localization policy to obtain localization attribute values from ProviderItemLocale entity 406.

It should also be noted that once the fully instantiated and localized entity 400 is returned to requester 402, requester 402 can directly request from ProviderItem entity 400 the values of the attributes which have been localized. That is because the attribute values are actually changed in ProviderItem entity 400 so that no further look up needs to be done when a requester interacts with those values in entity 400.

Although the present invention has been described with reference to particular embodiments, workers skilled in the art will recognize that changes may be made in form and detail without departing from the spirit and scope of the invention.

What is claimed is:

1. A computer-implemented method of localizing data represented by a requested entity, the method comprising:
    receiving a request to instantiate the requested entity;
    accessing metadata associated with the requested entity that identifies other entities related to the requested entity, wherein at least a localization entity and a localization policy handler entity are identified as being associated with the requested entity, the requested entity, localization entity, and localization policy handler entity comprising separate entities in an object-oriented data accessing system, wherein the localization entity is instantiated when the requested entity is instantiated and contains localization information to localize data represented by the requested entity, and wherein the localization policy handler entity includes logic for obtaining localization information from the localization entity to localize the requested entity, the localization policy handler including a predefined localization policy and a default localization policy;
    instantiating the localization policy handler entity;
    after instantiation of the requested entity, generating an event with the requested entity based on the instantiation of the requested entity, wherein the event identifies a particular locale and at least one attribute associated with the requested entity to be localized; and invoking a method on the localization policy handler entity, based on the event generated by the requested entity, to obtain localization values from the localization entity and provide the localization values to the requested entity, wherein invoking comprises:

invoking a method on the localization entity with the localization policy handler entity to look for desired localization values by passing an attribute ID, for each attribute associated with the requested entity to be localized, from the localization policy handler entity to the localization entity and implementing the predefined localization policy of the localization policy handler entity to access the localization information contained in the localization entity based on the attribute ID;

if the desired localization values are not found, performing a default localization using the default localization policy of the localization policy handler entity to retrieve default localization values from the localization entity; and providing at least one of the desired localization values and the default localization values, obtained from the localization entity, from the localization policy handler entity to localize the requested entity using a processor of the computer.

2. The method of claim 1 wherein retrieving default localization values comprise:
executing multiple step defaulting logic to obtain the default localization values.

3. The method of claim 1 wherein accessing the localization entity comprises:
performing localization look-up operations, looking for localization values, in an order based on the predefined localization policy.

4. The method of claim 1 wherein the association between the requested entity and the localization entity is stored in a metadata store, and wherein instantiating the localization entity comprises:
accessing the metadata store to identify entities that are associated with the requested entity; and
instantiating the requested entity and the identified entities.

5. The method of claim 1, wherein the requested entity, localization entity, and localization policy handler entity comprise entities of an object-oriented model.

6. A localization system for localizing data represented by a requested entity, the system comprising:
a processor;
a computer storage medium having stored thereon computer executable instructions for configuring the processor to implement system components comprising:
an object-oriented entity instantiating system that receives a request to instantiate the requested entity and instantiates the requested entity, wherein the entity instantiating system accesses metadata associated with the requested entity that identifies other entities related to the requested entity, wherein at least a localization entity and a localization policy handler entity are identified as being associated with the requested entity, wherein the requested entity, localization entity, and localization policy handler entity comprise separate entities in an object-oriented data accessing system, wherein the entity instantiating system instantiates at least the localization entity and the localization policy handler entity associated with the requested entity, the localization policy handler entity being configured to communicate between the localization entity and the requested entity and including logic for obtaining localization information from the localization entity to localize the requested entity, the localization policy handler including a predefined localization policy and a default localization policy;

wherein the localization entity includes localization values for localizing the data in the requested entity and identifies at least one attribute of the requested entity to be localized, wherein the requested entity generates, after instantiation of the requested entity, an event that identifies a particular locale and the at least one attribute associated with the requested entity to be localized; and wherein the localization policy handler entity passes information pertaining to the at least one attribute to the localization entity and retrieves the localization values from the localization entity, wherein the localization policy handler entity retrieves the localization values by invoking a method on the localization entity to look for desired localization values by passing an attribute ID, for each attribute associated with the requested entity to be localized, to the localization entity and implementing the predefined localization policy of the localization policy handler entity to access the localization information contained in the localization entity based on the attribute ID, and wherein if the desired localization values are not found a default localization is performed using the default localization policy of the localization policy handler entity to retrieve default localization values from the localization entity, wherein at least one of the desired localization values and the default localization values obtained from the localization entity are provided from the localization policy handler entity to localize the requested entity.

7. The system of claim 6 and further comprising:
an entity instantiating system that receives a request to instantiate the requested entity and instantiates the requested entity and entities associated with the requested entity based on the request.

8. The localization system of claim 6, wherein the localization system comprises an object-oriented system and the requested entity, localization entity, and localization policy handler entity comprise entities of an object model.

9. An object model that is encoded on a computer readable storage medium and is accessed by a computer in a data localization system to localize data, the object model comprising:
a requested entity;
a localization entity associated with the requested entity and including localization values for localizing data in the requested entity, the localization entity identifying at least one attribute of the requested entity to be localized;
a localization policy handler entity that is invoked by the requested entity based on an event generated by the requested entity, wherein the localization policy handler entity is configured to communicate between the localization entity and the requested entity and includes logic for obtaining localization information from the localization entity to localize the requested entity, the localization policy handler including a predefined localization policy and a default localization policy that are stored by the localization policy handler entity;
wherein the event identifies a particular locale and at least one attribute of the requested entity to be localized, wherein the localization policy handler entity retrieves the localization values from the localization entity based on the event generated by the requested entity and returns the localization values to the requested entity, wherein the localization policy handler entity retrieves desired localization values from the localization entity according to the predefined localization policy by passing information related to the locale and the attribute ID for each of the at least one attribute to the localization entity;

wherein if the desired localization values are not found the localization Dolicy handler entity performs default localization of the requested entity according to the default localization policy to retrieve default localization values from the localization entity; and wherein at least one of the desired localization values and the default localization values obtained from the localization entity are provided from the localization policy handler entity to localize the requested entity.

10. The object model of claim 9 wherein the localization entity comprises:

a collection of localization entities.

11. The object model of claim 9 wherein the localization policy handler entity comprises a policy handler entity exposing a method invoked by the requested entity.

12. The object model of claim 9 wherein the localization policy handler entity retrieves the localization values according to a predefined localization policy.

13. The object model of claim 12, wherein the predefined localization policy looks for desired localization values, retrieves default localization values if the desired localization values are unavailable, and returns the default localization values to the requested entity.

14. The object model of claim 13, wherein the default localization includes multiple step defaulting logic to obtain the default localization values.

* * * * *